March 30, 1937.  T. W. BYRD  2,075,175

METHOD AND APPARATUS FOR PURIFYING LIQUIDS

Filed Feb. 14, 1935    3 Sheets-Sheet 1

Inventor
Thomas W. Byrd,
By
Attorneys

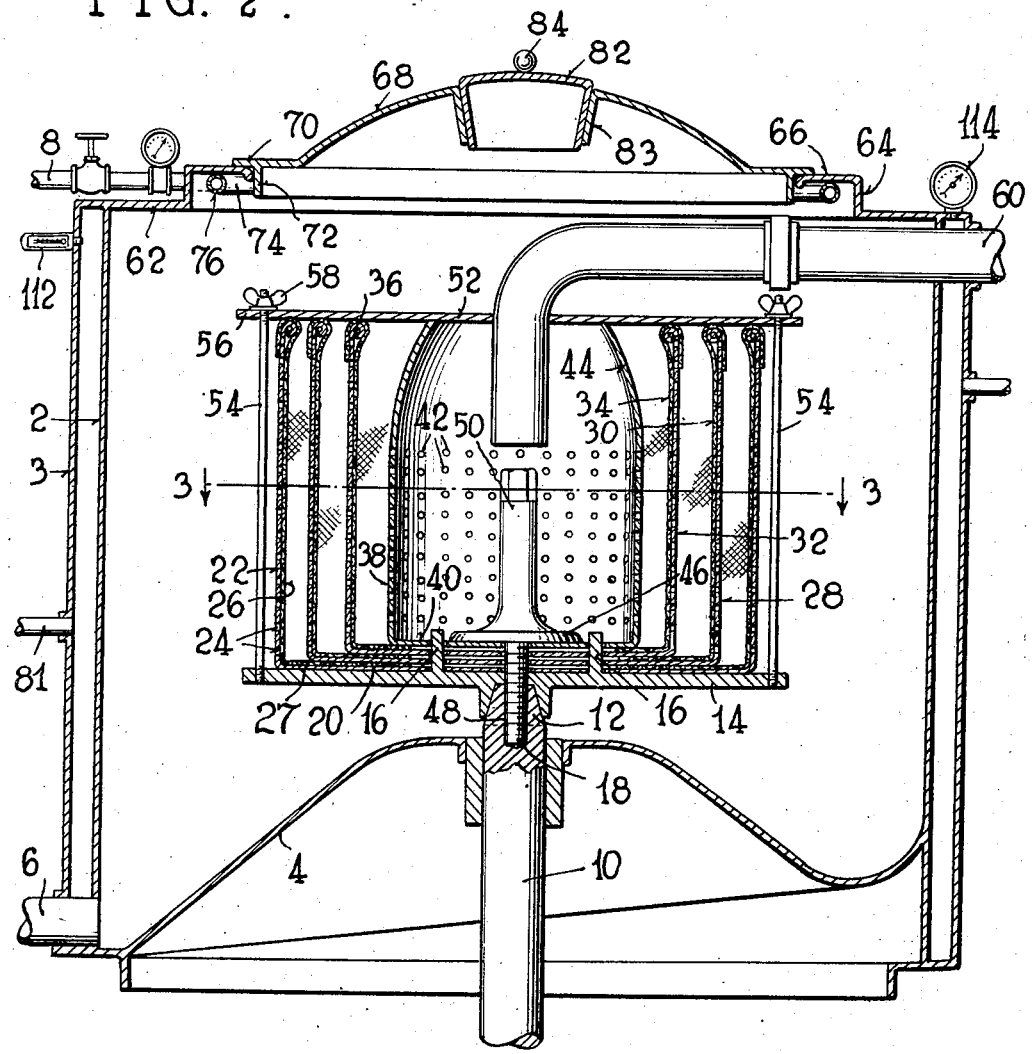

March 30, 1937.  T. W. BYRD  2,075,175
METHOD AND APPARATUS FOR PURIFYING LIQUIDS
Filed Feb. 14, 1935  3 Sheets-Sheet 3

Inventor
Thomas W. Byrd,
By Bailey
Attorneys

Patented Mar. 30, 1937

2,075,175

UNITED STATES PATENT OFFICE 2,075,175

METHOD AND APPARATUS FOR PURIFYING LIQUIDS

Thomas W. Byrd, Americus, Ga.

Application February 14, 1935, Serial No. 6,575

5 Claims. (Cl. 210—66)

My invention relates to a method and apparatus for purifying liquids, and more particularly for filtering, sterilizing and deodorizing dairy products, such as cream.

The primary object of my invention is to provide an apparatus which will remove solid impurities from the cream and simultaneously sterilize and deodorize the same.

In the devices now in use for the treatment of cream to be made into butter, many impurities, such as dust, are not removed and will be found in the finished product. The bacteria count is often high, and odorous constituents are not completely removed.

One feature of the invention consists in a novel apparatus for filtering cream or other liquids so as to remove therefrom all impurities such as hair, dirt, insects, and other foreign matter. A special advantage of my apparatus is that several successive filtering operations are provided without subjecting the liquid to numerous sharp impacts, rapid changes of direction or other undesirable handling operations. Such treatment, especially in the case of cream, is undesirable as any series of impacts tends to churn the cream into butter which can no longer be filtered.

Another object of the invention is to sterilize the cream, and particularly to remove odorous constituents therefrom simultaneously with the sterilization. This object I accomplish by subjecting the liquid in atomized condition to the action of a hot gaseous medium, such as steam or air.

A further object of the invention resides in the use of a centrifugal filter for purifying the cream, from which filter the cream is expelled in atomized form. The steam or hot air acts on this atomized liquid as it escapes from the filter. In this fashion the same rotary movement both provides the force needed to cause the liquid to pass through the filters and to atomize the liquid.

The invention further contemplates other important constructional details. One of these is the use of a plurality of concentric, rotating filter drums or cylinders. Within the central drum I provide a cylindrical, perforated distributing or equalizing member to cause the liquid to flow out equally in all directions. Another important aspect is the arrangement of a filter which can be substituted for the discs of the ordinary centrifugal bowl separator, so that cream can be cleaned by such a device. Finally, I provide a special arrangement of steam inlet pipes so located as to be protected so that the liquid will not strike the pipes and dry or cook thereon.

In the past, efforts have been made to remove solid particles from cream by means of metal filter screens. Even where such screens have as many as 625 holes to the square inch, they will not clean the cream satisfactorily. According to the present invention, non-metallic, flexible filtering material, preferably of a fibrous nature, is used.

Further objects and advantages of the invention will appear more fully from the following description, particularly when taken in conjunction with the accompanying drawings which form a part thereof.

In the drawings:

Fig. 2 is a vertical cross section through the same, substantially on the line 2—2 of Fig. 3.

Figure 1:
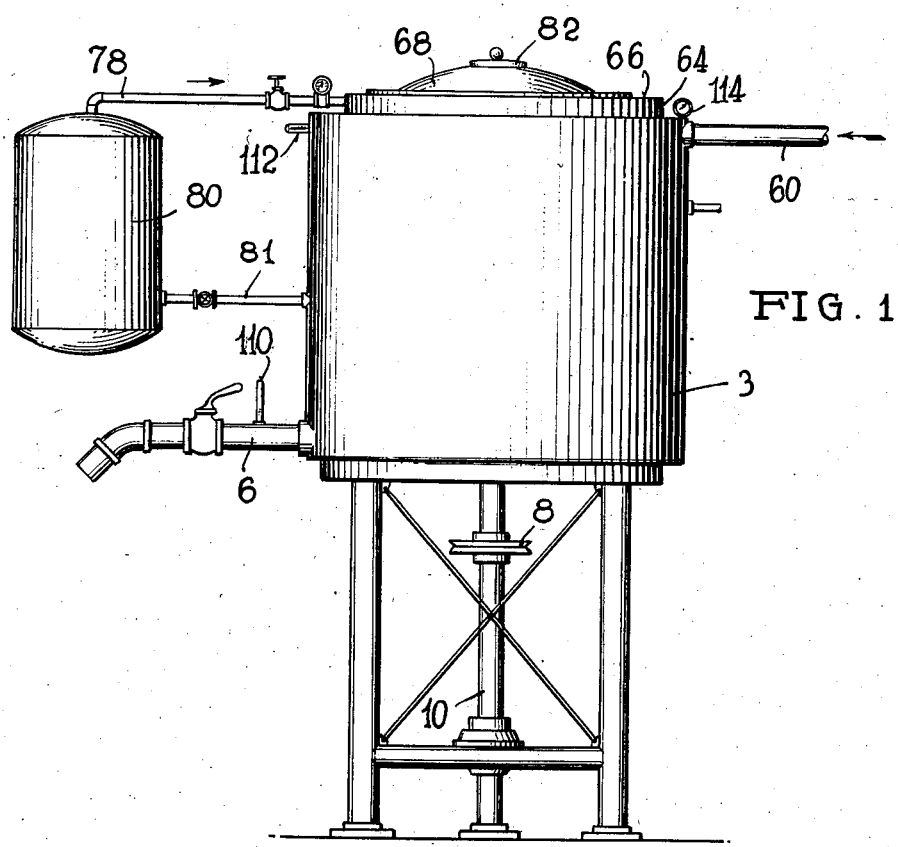
Fig. 1 is a side elevation of machine according to one embodiment of my invention.
Figure 3:
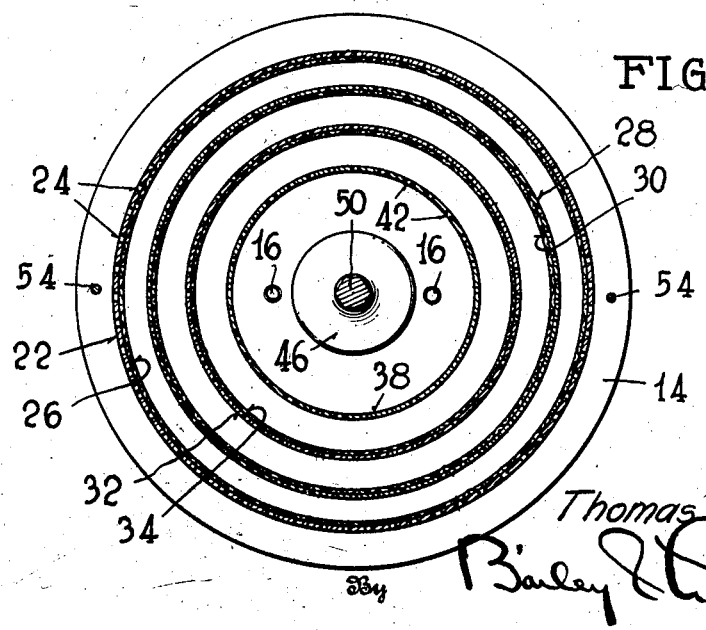
Fig. 3 is a cross section on the line 3—3 of Fig. 2.

The apparatus is housed in a cylindrical casing 2 surrounded by a steam jacket or other suitable insulating covering 3. The bottom wall 4 of the casing is formed as a collector in such a manner as to guide liquid falling thereon to the spout or outlet 6. A pulley 8 below the casing transmits power from any suitable source to a vertical shaft 10 which extends upward to the center of the bottom wall.

The upper end of the shaft 10 is tapered, and on this end fits a boss 12 integral with a base plate 14 located within but near the bottom of the casing. Dowels 16 extend upwardly from the base plate 14. An opening is provided in the center of plate 14, and below this opening is a threaded recess 18 in the top of the shaft 10.

Figure 4:
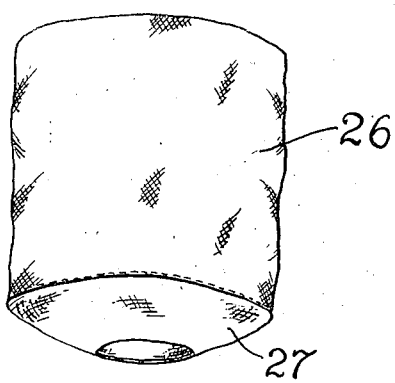
Fig. 4 is a perspective view of one of the filter bags.

On top of the base plate is the bottom wall 20 of the outer rigid drum 22, consisting of a substantially cylindrical sheet metal or wire mesh member provided with numerous perforations 24. The bottom wall 20 has openings which engage over the dowels 16 to key the drum to the base plate, and also a central opening. Within this drum is arranged a bag or bags 26 of filtering material (Fig. 4), such as chamois, flannel or silk or other suitable flexible, fibrous material. This bag has a cylindrical form of a diameter substantially equal to the inner diameter of the drum 22, and a bottom wall 27 is provided having a central opening. This opening is large enough to permit both the dowels 16 to pass therethrough.

Within the drum 22 is a similar rigid perforated drum 28 of smaller diameter, and a filter bag or bags 30 within drum 28. A third rigid perforated drum 32 and a filter bag or bags 34 are also provided. Obviously, however, the number of drums may be varied.

The bottoms of bags 26, 30 and 34 are each large enough to extend beneath the bottom wall of the next upper drum and to be clamped thereby. The bottom wall of each drum has perforations fitting over the dowels 16 and a central opening. The upper edges of the drum walls are turned inwardly, as at 36, and the upper edges of the bags are folded over these inwardly bent portions and hang over on the outer sides of the drums.

Within the drum 32 is a distributing member 38, the bottom wall 40 of which also has openings for engagement with the dowels 16 and a central opening. This bottom wall 40 overlies and clamps the bottom of the bag 34. The distributing drum 38 is also provided with numerous perforations 42. The upper edge of the wall of drum 38 is turned inwardly as at 44, this inwardly turned upper edge being unperforated or solid.

In order to secure the drums and bags on the base plate 14 and to clamp the bags between the drums, I provide a holding member consisting of a plate 46 having a downwardly threaded extension 48 which passes through the openings in the bottom walls of the drums and is threadedly engaged in the recess 18. The upper part 50 of this member is formed as a nut to aid in securing it in place and further to assist in distributing and spreading the liquid. Over the upper edges of all of the drums fits a cover plate 52 having a central opening. This plate is held in place by bolts 54 pivoted to the lower base plate 14 and entering into notches 56 in the cover, the upper ends of bolts 54 being provided with wing nuts 58 to clamp the cover down tightly. It will be evident that the bags are clamped between this cover and the upper edges of the drums 22, 28 and 32.

Cream is supplied to the device by means of a pipe 60 which enters through one side wall of the casing 2 and extends downwardly within the drum 38 through the open top thereof to a point slightly above the top of the spreading member 50. Cream may be supplied to this pipe either by pumping or by gravity, or in any other suitable manner.

The side wall of the casing 2 ends at its top in an inwardly turned flange 62 above which is an upward extension 64 and a second inwardly turned flange 66. A cover 68 closes the opening formed by the inner edge of the flange 66, this cover being provided with a section 70 which rests on the flange and with a downwardly extending flange 72 which fits within the opening of the flange 66. The walls 64 and 72 thus form a downwardly opening channel in which are arranged one or more steam pipes 74 provided with a plurality of perforations or nozzles 76, steam being supplied to this pipe through tube 78 from a boiler 80. This boiler through pipe 81 may also supply steam to the jacket 3.

In the top of the cover 68 is a frusto-conical opening formed by an inwardly and downwardly bent flange 83. This flange forms with the cover an angle or trap so that any liquid which may be thrown upward towards the opening will be deflected back into the casing. In this opening fits a frusto-conical closure 82, this closure being removable by means of a ring or handle 84.

The operation of my device, and the method which is accomplished thereby, is as follows:

The shaft 10 is driven at a high speed, for example 1100 revolutions per minute, by a motor, thus imparting rapid rotary motion to the drum assembly. Cream is introduced through the pipe 60 and falls on the rapidly rotating distributor 50. This member spreads the cream horizontally outwardly, and at the same time imparts a certain amount of rotary motion thereto. The body of cream tends to fill the drum 38, and this drum acts to impart further rotary motion and to distribute the cream evenly around the circumference of the drum. The cream passes through the perforations in drum 38 and strikes the filter bag 34, this filter bag being supported by the rigid drum 32. The cream passes through the filter bag, but this first bag will catch and hold the greater part of the solid impurities in the cream. The cream passing through this bag and through drum 32 will now reach the second bag 30 which is supported by drum 28 and will be further filtered by such bag. The final filtering action is accomplished by the bag 26 supported by drum 22. When the cream finally passes outwardly through the perforations in drum 22, practically all solid impurities have been removed, and the cream is clean.

The cream escaping through the last bag 26 and drum 22 is in the form of a finely divided spray or mist, or in other words is atomized. As the cream passes across the space between the outer drum 22 and the walls of casing 2, it is mingled with a spray of hot steam or other hot gas from tube 74. This hot gas kills substantially all bacteria in the cream and thereby sterilizes it. At the same time, the heated gas will either vaporize any odorous constituents in the cream or will tend to absorb such constituents and carry them off.

The cream is collected in the bottom of the casing and escapes from the spout 6 in practically pure condition. The hot gas may escape partly through the spout 6, but if the pressure becomes too high the closure 82 will be raised by the pressure and will permit any excess gas to escape. Obviously, where steam is used, it is desirable to have this steam hot enough to avoid such condensation as would increase the water content of the cream. I have found that steam at 100 pounds pressure or higher is especially suitable, as the heat in this steam will prevent any condensation, or if any condensation does occur the amount of water vaporized by the steam will be greater than the quantity condensed, so that the cream will not be diluted. However, other hot gases, such as hot air, at a temperature corresponding to that of the steam may also be used.

In connection with the construction of the machine, there are several points of importance. Of course the centrifugal force will tend to cause the cream to rise in the drums and overflow the top edges thereof. This is effectively prevented by the fact that the upper edges of the drums are turned inwardly, and particularly by the inwardly turned solid section 44 of the distributing drum 38. Furthermore, the top or cover 52 acts to prevent any such overflow.

A further important feature of my invention is in the arrangement of the steam pipe in a channel formed by the walls 64 and 72. Any cream striking the side walls of the container 2 and tending to splash upwardly will strike the inwardly turned shoulder 62 and will then drop to the bottom of the casing 2. If cream should by any chance escape from the central drum 38, it will strike the wall 72 and will be deflected downwardly into the casing. It is thus impossible for any of the cream to contact with the steam pipe 74. This pipe is at a high heat, and the contact of cream with the pipe would cook the cream which will either produce a coating and clogging of the pipe or will discharge into the finished cream cooked solid particles which would destroy the quality of the final product. It is thus important that the steam pipe be located in a downwardly opening channel spaced inwardly from the side walls of the casing.

Figure 5:
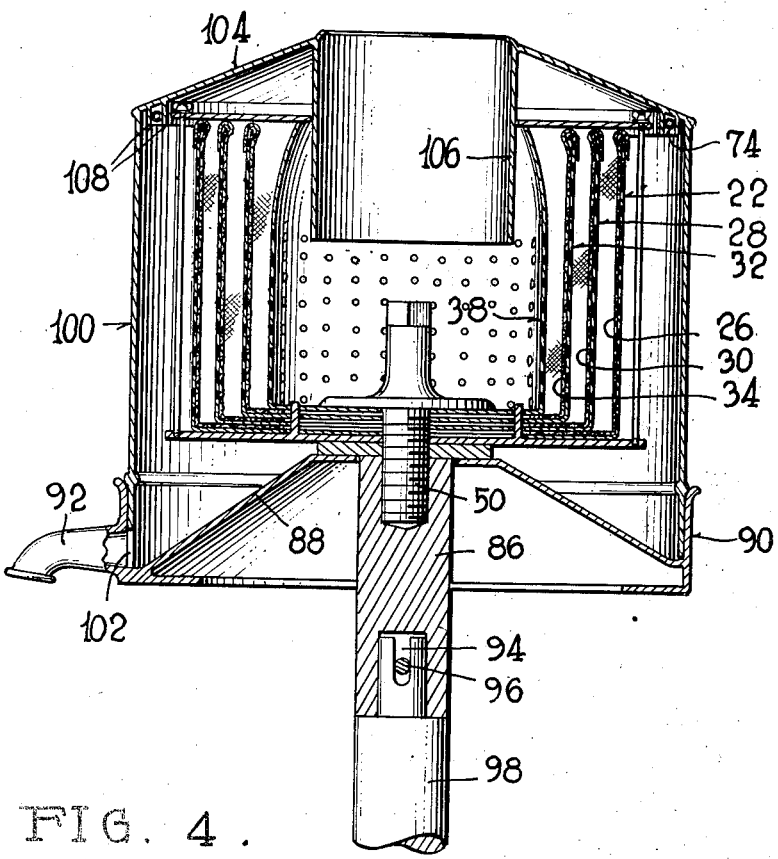
Fig. 5 is a vertical cross section through a modified form of purifier.

A modified form of the invention, applicable for use as a substitute for the separating discs of the usual cream separator, is shown in Fig. 5. In this form, a drum assembly substantially similar to that shown in Fig. 1 and consisting of perforated drums 22, 28, 32 and distributing drum 38, and the intervening bags 26, 30 and 34 is secured by a threaded clamping member 50 on the upper end of a coupling member 86. This coupling member extends downwardly through an opening in a collecting member consisting of a bottom wall 88 of conical shape and a vertical side wall 90, liquid escaping from the collecting member through a spout 92. Shaft 86 engages, by a suitable connection such as a slot 94, with a pin 96 mounted at the upper end of a suitably driven shaft 98. This is the usual shaft of the cream separator, and may be driven in any suitable fashion.

The side wall is formed by a cover consisting of a cylindrical section 100 which fits in the vertical wall 90 of the collecting member and is provided with a notch 102 which may be brought into alignment with the spout 92 so as to permit the escape of liquid from the collector. Integral with the drum-like wall 100 is a conical cover section 104, at the center of which is a downwardly directed inlet sleeve 106 which fits into the top opening in drum 38 and permits the introduction of liquid into the drum. Around the edge of the cover 104, and spaced slightly inward from the side wall 100, are a pair of spaced flanges or walls 108 which form a channel in which is arranged the steam pipe 74.

It will be evident that the operation of this device is substantially the same as of that shown in Figs. 1 to 4. Upon rotation and introduction of the cream, the cream will be filtered centrifugally outwardly, and will be thrown out as a spray through the last drum 22. Steam from pipe 74 will mingle with the spray, and as both the spray and the steam are in finely subdivided form an intimate contact therebetween will be obtained. The purified and sterilized cream will escape through spout 92.

According to the invention the cream or other liquid is purified by passing it centrifugally outward through a distributing member and a series of concentric fibrous filtering elements which are rigidly supported. In this manner, the liquid is subjected to a plurality of successive filtering steps without any intermediate handling and without subjecting it to unnecessary impacts or shocks. Each of these steps is accomplished by the use of a rigid, rotating perforated drum which acts as a support for a filter bag of flexible, fibrous material, the bag acting as a lining for the drum. Finally, the liquid in atomized form escaping from the last filtering step is intimately mingled with a hot gas so as to sterilize and deodorize it.

In order to observe and regulate the temperature of the escaping cream, so as to be certain that it has been sufficiently heated to ensure pasteurization, I may provide a thermometer 110 on the spout 6. Further, the temperature and pressure in the insulating jacket 3 may be observed by a thermometer 112 and steam gauge 114.

While I have described herein the application of my invention to dairy products and particularly to cream, I wish it to be understood that both the method and apparatus are applicable to the filtering and purification of other liquids, such as for example cotton seed oil, gasolines, perfumes and the like. Furthermore, where I have used in the specification and claims the term "gaseous medium", I wish it to be understood that this term is intended to cover a material which is a gas at ordinary temperatures or a material which is ordinarily liquid but which has been vaporized by heat.

While I have described herein some embodiments of my invention, I therefore wish it to be understood that I do not intend to limit myself thereby except within the scope of the appended claims.

I claim:

1. In a machine of the class described, a casing, a perforated drum within said casing, means to rotate said drum about its axis, a filter bag within said drum of fibrous material lining the inner wall of the drum, means to feed a liquid to the inside of said drum, said drum acting to filter the liquid and to spray the same in atomized form into the space outside the drum, and means to supply a hot gaseous medium to such space to mingle with the atomized liquid, said last means comprising a pipe, said casing having a wall at the end of said drum provided with an inwardly opening channel spaced inwardly from the wall of the casing opposite the side of the drum, said pipe being located in said channel and having inwardly opening nozzles therein.

2. In a device of the class described, a plurality of concentric rigid perforated drums, means to rotate said drums about their common axis, bags of flexible fibrous material, one mounted within each of said drums and lining the perforated wall thereof, the free edge of each bag overlying the outer edge of the wall of the drum in which the bag is arranged, and a cover plate overlying all of said drums and clamping said portions of the bags against the outer edges of the drum walls.

3. In a device of the class described, a plurality of concentric rigid perforated drums, means to rotate said drums about their common axis, said drums having superimposed bottom walls, bags of fibrous material, one mounted within each of said drums and lining the perforated wall thereof, each of said bags having a portion extending beneath the bottom wall of the next inner drum, whereby the bottoms of said bags are clamped between the bottom walls of the drums, the free edge of each bag overlying the outer edge of the wall of the drum in which the bag is arranged, and a cover plate overlying all of said drums and clamping said portions of the bags against the outer edges of the drum walls.

4. In a machine of the class described, a casing, means within said casing to rotate a body of liquid and to atomize the same, means to feed liquid to said atomizing means, and means to supply a hot gaseous medium to the space in said casing outside said atomizing means to mingle with the atomized liquid, said last means comprising a pipe, said casing having a wall at one end thereof provided with an inwardly opening channel spaced inwardly from the wall of the casing opposite the said atomizing means, said pipe being located in said channel and having inwardly opening nozzles therein.

5. The method of purifying liquid dairy products which consists in rotating a body of the liquid, thereby developing centrifugal force therein, passing the liquid by means of pressure derived from such centrifugal force radially outwardly with respect to the axis of rotation of the body of liquid through a fibrous filtering element, thereby removing solid particles from the liquid and simutaneously breaking up the liquid into a finely atomized mist, and mingling steam with the atomized mist to sterilize the liquid and remove odorous constituents therefrom, the quantity and temperature of such steam being sufficient substantially to prevent any condensation thereof, but being insufficient to evaporate any substantial quantity of the water content of the liquid.

THOMAS W. BYRD.